United States Patent [19]

Siedlecki, Jr.

[11] Patent Number: 5,113,649
[45] Date of Patent: May 19, 1992

[54] PASSIVE BYPASS VALVE ASSEMBLY

[75] Inventor: Walter F. Siedlecki, Jr., West Chester, Ohio

[73] Assignee: General Electric Company, Cincinnati, Ohio

[21] Appl. No.: 522,346

[22] Filed: May 11, 1990

[51] Int. Cl.$^5$ .............................................. F02K 3/04
[52] U.S. Cl. ...................................... 60/226.3; 60/262
[58] Field of Search .................... 60/224, 226.1, 226.3, 60/262, 264

[56] References Cited

U.S. PATENT DOCUMENTS

| 3,638,428 | 2/1972 | Shipley et al. | 60/226 |
|---|---|---|---|
| 3,946,257 | 6/1976 | Lardellier | 60/226.1 |
| 4,054,030 | 10/1977 | Pedersen | 60/262 |
| 4,064,692 | 12/1977 | Johnson et al. | 60/261 |
| 4,068,471 | 1/1978 | Simmons | 60/262 |
| 4,069,661 | 1/1978 | Rundell et al. | 60/204 |
| 4,072,008 | 2/1978 | Kenworthy et al. | 60/261 |
| 4,085,583 | 4/1978 | Klees | 60/204 |
| 4,112,677 | 9/1978 | Kasmarik | 60/226.1 |
| 4,151,714 | 5/1979 | Scrace | 60/226 B |
| 4,175,384 | 11/1979 | Wagenknecht et al. | 60/226 B |
| 4,222,233 | 9/1980 | Johnson et al. | 60/225 |
| 4,261,686 | 4/1981 | Weiler | 415/151 |
| 4,294,068 | 10/1981 | Klees | 60/204 |
| 4,390,318 | 6/1983 | Weiler | 415/145 |
| 4,409,788 | 10/1983 | Nash et al. | 60/226.3 |
| 4,461,145 | 7/1984 | Stephens | 60/226.3 |
| 4,715,779 | 12/1987 | Sucia | 60/226.1 |
| 4,813,229 | 3/1989 | Simmons | 60/204 |

FOREIGN PATENT DOCUMENTS

| 0777838 | 6/1957 | United Kingdom . |
|---|---|---|
| 1029413 | 5/1966 | United Kingdom . |
| 1103811 | 2/1968 | United Kingdom . |
| 2183786 | 6/1987 | United Kingdom . |
| 2192940 | 1/1988 | United Kingdom ........ 60/226.3 |

Primary Examiner—Louis J. Casaregola
Attorney, Agent, or Firm—Jerome C. Squillaro; David L. Narciso

[57] ABSTRACT

A bypass valve assembly for a gas turbine engine includes a frame defining a first flow channel in flow communication second and third flow channels separated by a splitter. A plurality of circumferentially juxtaposed bypass doors are disposed in the second channel and are positionable between a closed position preventing airflow into the second channel and an open position providing for substantially unobstructed airflow into the second channel. Means for automatically positioning the doors in the open and closed positions in response to differential pressure across the doors in the second channel include a spring which provides a closing torque on the door which decreases for at least a portion of the travel of the doors from the closed to open position.

20 Claims, 5 Drawing Sheets

PASSIVE BYPASS VALVE ASSEMBLY

CROSS-REFERENCE TO RELATED APPLICATION

This invention is related to concurrently filed patent application, Ser. No. 07/522024, by L. W. Stransky et al. entitled "Method and Apparatus for Automatic Bypass Operation," which is commonly owned by the present assignee docket number 13DV-10151.

TECHNICAL FIELD

The present invention relates generally to gas turbine engines, and, more specifically, to an improved bypass valve assembly.

BACKGROUND ART

A conventional variable cycle gas turbine engine includes a core engine driving a fan, and a bypass duct surrounding the core engine which is in flow communication with the fan. A conventional bypass valve is disposed at an upstream, inlet end of the bypass duct and is positionable in a closed position which substantially blocks flow from the fan into the bypass duct under certain conditions in the flight envelope of an aircraft being powered by the engine while allowing flow from the fan to be channeled into the core engine. The bypass valve is also positionable in an open position which allows substantially unobstructed flow from the fan into the bypass duct for bypassing a portion of the fan air around the core engine while allowing the remaining portion of the fan air to be channeled through the core engine during operation of the aircraft at other conditions in the flight envelope.

Conventional bypass door assemblies are relatively complex and are controlled in accordance with predetermined schedules corresponding to operation in the flight envelope of the aircraft. An exemplary conventional bypass valve assembly includes an annular ring valve which is translatable to open and close an annular inlet to the bypass duct. Conventional linkages and servovalves are used to translate the valve and are operatively connected to the control system of the engine for being responsive to the predetermined schedules contained in the control system for opening and closing the bypass valve at various conditions in the flight envelope.

In the open position, the bypass valve must provide for substantially unobstructed flow into the bypass duct for reducing or minimizing pressure losses therefrom which would decrease performance of the engine and reduce the cooling ability of the bypass air channeled in the bypass duct. The bypass air is typically used to cool downstream structures in the engine, such as, for example, a conventional augmenter and variable area exhaust nozzle, and any pressure losses due to the bypass duct would have to be accommodated, typically by increasing pressure in the bypass duct which decreases engine performance. Furthermore, the bypass valve must also provide for substantially unobstructed flow into the bypass duct to prevent or minimize any back pressure on the fan which could undesirably reduce stall margin of the fan. This factor is even more significant in an engine wherein the fan stall margin has a "pinch point", or minimum value, which occurs at about the same condition in the flight envelope when the bypass valve must open fully.

The bypass valve in the form of a mode selector valve in a bypass engine is typically positioned either in a fully open, or a fully closed position, although intermediate positions may be desirable in certain other embodiments. Accordingly, the bypass valve is typically open or closed relatively quickly when required for operation in the flight envelope when transitioning between low and high bypass operation, for example.

OBJECTS OF THE INVENTION

Accordingly, one object of the present invention is to provide a new and improved bypass valve assembly.

Another object of the present invention is to provide a bypass valve assembly which is passive and is operable automatically in response to the flight envelope associated with the aircraft gas turbine engine.

Another object of the present invention is to provide a bypass valve assembly which is relatively compact, simple, lightweight, and does not require actuation by the main control of the gas turbine engine.

Another object of the present invention is to provide a bypass valve assembly having a valve which is automatically positionable in an open position having substantially unobstructed flow into a bypass duct.

Another object of the present invention is to provide a bypass valve assembly which is positionable to open and closed positions with a relatively quick transition.

DISCLOSURE OF INVENTION

A bypass valve for controlling fluid flow in a gas turbine engine includes a frame having a fluid flow channel and a plurality of circumferentially juxtaposed bypass valve doors disposed in an annular opening in the frame, with each door having a first end pivotally connected to the frame. The doors are positionable in a first position, and in a second position inclined relative to the frame. Means for automatically positioning the doors in the first and second positions in response to differential pressure across the doors in the channel are provided. In a preferred embodiment, the positioning means effects a closing torque on the doors which decreases for at least a portion of travel of the doors from closed to open positions.

BRIEF DESCRIPTION OF DRAWINGS

The novel features believed characteristic of the invention are set forth and differentiated in the claims. The invention, in accordance with preferred, exemplary embodiments, together with further objects and advantages thereof, is more particularly described in the following detailed description taken in conjunction with the accompanying drawing in which:

MODE(S) FOR CARRYING OUT THE INVENTION

Figure 1:
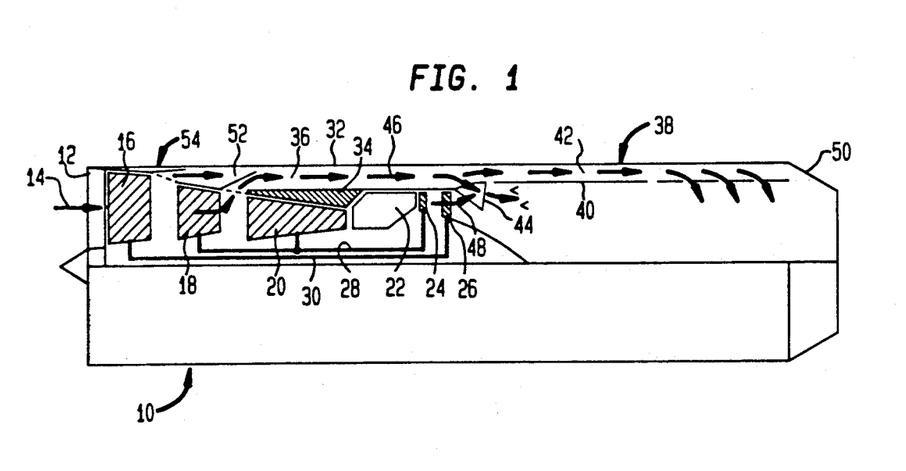
FIG. 1 is a schematic representation of a variable cycle gas turbine engine for powering an aircraft which includes a bypass valve assembly in accordance with one embodiment of the present invention.

Illustrated in FIG. 1 is a schematic representation of an exemplary variable cycle gas turbine engine 10 for powering an aircraft in a flight envelope including subsonic and supersonic speeds at various altitudes. The engine 10 includes an annular inlet 12 for receiving ambient air 14 followed in turn by a conventional forward fan 16, aft fan 18, or low pressure compressor, high pressure compressor (HPC) 20, combustor 22, high pressure turbine (HPT) 24, and low pressure turbine (LPT) 26. The HPT 24 powers both the aft fan 18 and the HPC 20 through a conventional first shaft 28. The LPT 26 powers the forward fan 16 by a conventional second shaft 30.

The engine 10 further includes an outer casing 32 which is spaced from an inner casing 34 to define a conventional bypass duct 36 therebetween. Extending downstream from the outer casing 32 and the LPT 26 is a conventional afterburner, or augmenter, 38 which includes a conventional liner 40 surrounded by a conventional annular afterburner duct 42.

The afterburner duct 42 is in flow communication with the bypass duct 36 and a conventional mixer 44 is disposed therebetween for mixing a portion of bypass air 46 channeled though the bypass duct 36 with combustion discharge gases 48 discharged from the LPT 26, which are channeled into the afterburner 38 and discharged through a conventional variable area nozzle 50 disposed at the downstream end of the afterburner 38.

In this exemplary embodiment, the engine 10 is a double bypass engine including an optional, conventional valve 52 disposed in the inner casing 34 between the aft fan 18 and the HPC 20 for channeling a portion of the air 14 which flows through the aft fan 18 into the bypass duct 36 during certain operation of the engine 10. The valve 52 may be conventionally open or closed as desired or, in another embodiment, the valve 52 may be omitted which allows continuous flow of a portion of the air 14 from between the aft fan 18 and the HPC 20 into the bypass duct 36.

Figure 2:
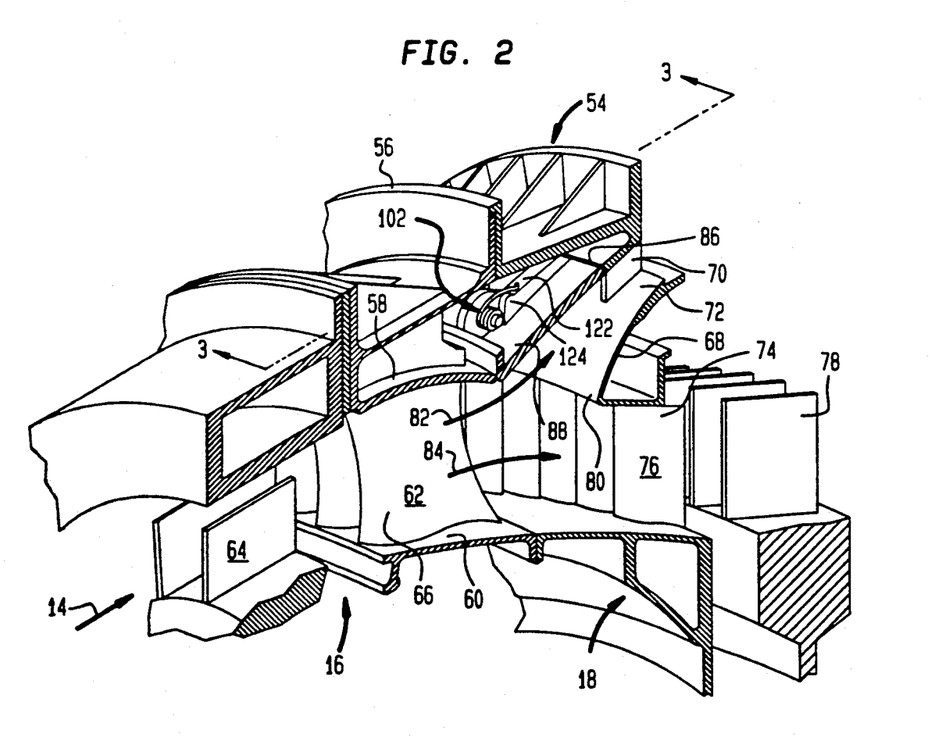
FIG. 2 is a perspective schematic representation of a portion of the bypass valve assembly illustrated in FIG. 1.
Figure 3:
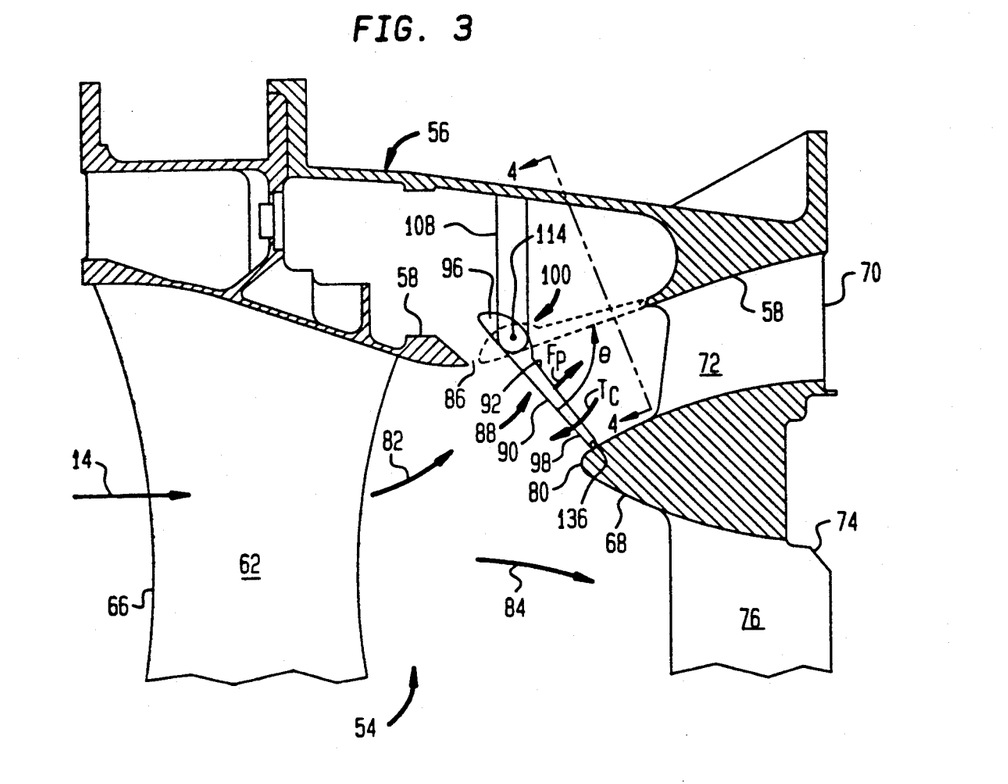
FIG. 3 is a sectional view of a portion of the bypass valve assembly illustrated in FIG. 2 taken along line 3—3.

The engine 10 is conventional except for a bypass valve assembly 54 in accordance with a preferred, exemplary embodiment of the invention disposed between the forward fan 16 and the aft fan 18. Illustrated in FIGS. 2 and 3 is the bypass valve assembly 54 shown in more particularity. The assembly 54 includes an annular fan frame 56 having an outer casing 58 and an inner casing 60 spaced radially inwardly from the outer casing 58 to define a first channel 62 for channeling the air 14. The forward fan 16 includes a plurality of conventional fan blades 64 which are conventionally connected to the second shaft 30, and a plurality of conventional fan outlet guide vanes (OGVs) 66 which are disposed in the first channel 62 for channeling the air 14. A conventional annular flow splitter 68 is conventionally fixedly disposed between the outer and inner casings 58 and 60 by a plurality of circumferentially spaced struts 70 extending between the outer casing 58 and the splitter 68 which casing and splitter define a second flow channel 72, or inlet to the bypass duct 36. The splitter 68 is conventionally connected to the inner casing 60 by a plurality of circumferentially spaced conventional inlet guide vanes (IGVs) 74 which defines therebetween a third flow channel 76, or inlet to the core engine. The aft fan 18 of the core engine includes the IGVs 74 and a plurality of conventional, circumferentially spaced blades 78 conventionally operatively connected to the first shaft 28. The splitter 68 includes a leading edge 80 which splits the air 14 into a bypass airflow 82 which is channeled into the second channel 72, and a core airflow 84 which is channeled into the third channel 76.

The assembly 54 further includes an annular opening 86 in the outer casing 58 facing the splitter 68. Disposed in the annular opening 86 is a plurality of circumferentially juxtaposed bypass valve doors 88. In an exemplary embodiment, there are 12 doors 88 disposed over the 360° circumferential extent of the opening 86.

Figure 4:
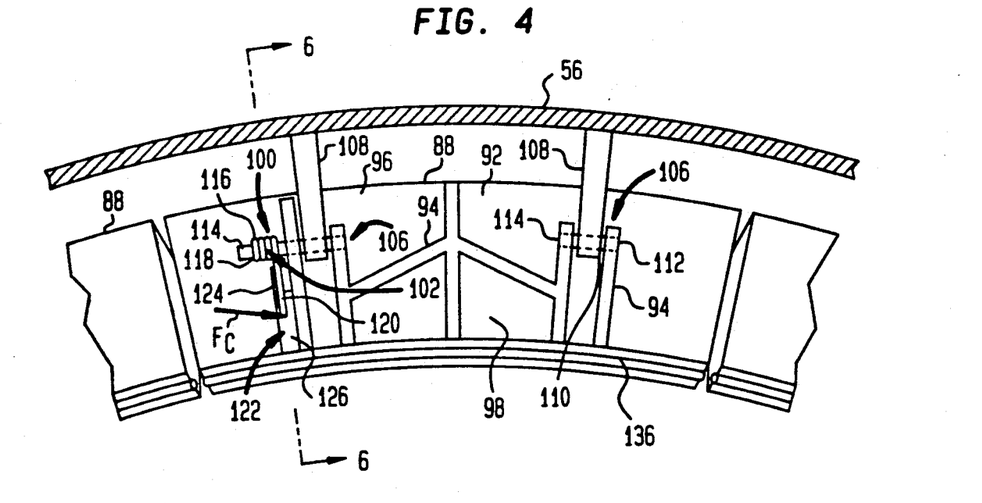
FIG. 4 is an upstream looking end view of a portion of the bypass doors illustrated in FIG. 3 taken along line 4—4.

As illustrated in FIGS. 3 and 4, each of the doors 88 includes an inner surface 90 which faces the splitter 68 and the bypass airflow 82 and forms a portion of the boundary of the second channel 72. The doors 88 also include an outer surface 92 which faces opposite to the inner surface 90. The doors 88 are relatively thin and preferably made from titanium for reducing weight, and include a plurality of conventional stiffening ribs 94 on the outer surface 92. Each of the doors 88 is pivotally connected to the frame 56 at an upstream end 96 of the door 88 as described in more detail below. The door 88 also includes a downstream end 98.

Each of the doors 88 is positionable in an open position as illustrated in FIG. 2, for example, and as illustrated in dashed line in FIG. 3 wherein the door 88 is disposed generally parallel in the annular opening 86 to allow for substantially unobstructed flow of the bypass airflow 82 from the first channel 62 to the second channel 72. The doors 88 are also positionable in a closed position as illustrated in solid line in FIG. 3 for substantially blocking flow of the bypass airflow 82 from the first channel 62 to the second channel 72, and thereby channeling all of the air 14 as core airflow 84 into the third channel 76 of the aft fan 18. During operation of the engine 10, the bypass airflow 82 impinges against the inner surface 90 of the doors 88 for generating a resultant pressure force $F_p$ acting on the door 88 which is an aerodynamic fluid opening force for opening the doors 88.

The assembly 54 further includes means 100 for automatically positioning the doors 88 in the open and closed positions in response to differential pressure across the doors 88 in the second channel 72. The positioning means 100 provides a closing torque $T_c$ on the doors 88 which decreases for at least a portion of angular travel $\theta$ of the doors 88 from the closed to the open position to allow for full opening of the doors 88 for obtaining substantially unobstructed flow.

More specifically, the differential pressure across the doors 88 may be defined as the difference between a pressure $P_1$ of the air 14 in the first channel 62 upstream of the doors 88 minus a pressure $P_2$ in the bypass duct 36, which may be represented at a position in the second channel 72 immediately downstream of the doors 88. During operation of the engine 10, the differential pressure $P_1-P_2$ (e.g., static pressure) has values ranging from positive values to negative values, with positive values creating positive values of the pressure opening force $F_p$ which rotate the doors counterclockwise and thereby open the doors 88, and the negative differential pressure $P_1-P_2$ causing negative values of the pressure opening force $F_p$ which rotate the doors clockwise to the closed position thereof.

This differential pressure $P_1-P_2$ is effectively used in accordance with the invention by having the positioning means 100 including in a particular embodiment, a conventional torsional spring 102 associated with each of the doors 88, which spring 102, in the preferred embodiment is made from conventional 17-4PH material. The spring 102 joins a respective door 88 to the frame 56 for providing a spring closing force $F_c$, and resulting closing torque $T_c$, as illustrated in FIGS. 3 and 4 acting on the door 88 in a direction opposite to the opening force $F_p$.

Figure 5:
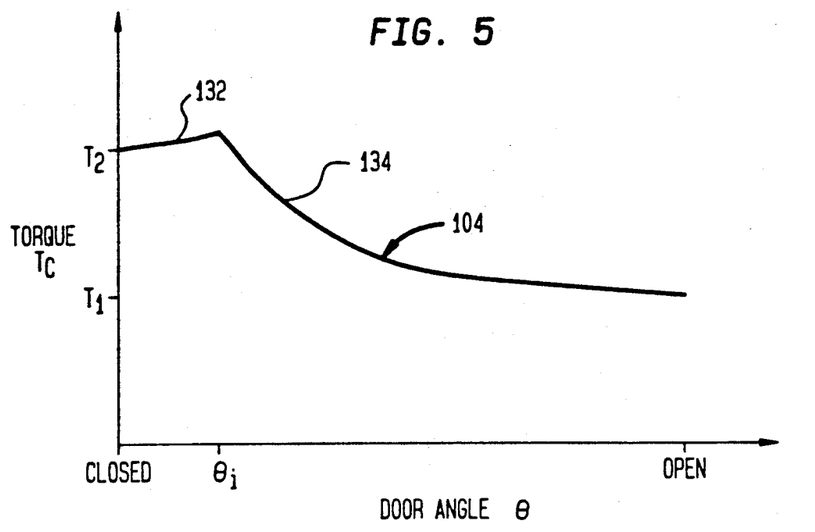
FIG. 5 is a graph plotting closing torque $T_c$ versus door angle $\theta$ for the bypass doors illustrated in FIGS. 4, 6 and 7.

Illustrated in FIG. 5 is a graph plotting the closing torque $T_c$ versus the door angle $\theta$ from the closed position to the open position representing a range of $\theta$ of about 40°. The closing torque $T_c$ is represented by a curve 104 having a minimum, first value $T_1$ obtained by conventially positioning the spring 102 for providing the closing torque first value $T_1$ in the door 88 open position which is at least large enough to close the door 88 against the force of gravity acting on the door 88 when the pressure opening force $F_p$ is zero, which may occur for example when the engine 10 is not running. It is to be noted that the doors 88 are disposed circumferentially around the opening 86 and at least some of the doors 88, without the use of the spring 102, would simply remain in the open position due to gravity i.e., those doors disposed at the bottom of the opening 86 which are disposed upside down relative to those shown in FIG. 3. Accordingly, the spring 102 is sized and positioned for at least overcoming the force of gravity on the door 88 for placing the door 88 initially in the closed position. As described hereinbelow, the positioning means 100 further allows for a second value $T_2$ of the closing torque $T_c$ in the door closed position which is greater than the closing torque first value $T_1$.

It is to be noted that the conventional torsion spring 102 is sized and positioned relative to the door 88 for providing a closing torque $T_c$ which would ordinarily result in an increase in the closing torque $T_c$ as the door is moved from the closed position to the open position, but for the present invention. Springs conventionally provide an increase in restoring force as they are compressed or expanded which is undesirable in accordance with the present invention because a conventional spring arrangement acting on the door 88 would require continually increasing force to open the door 88 which may result in the door 88 not being fully opened and thereby obstructing the bypass airflow 82 in the second channel 72.

In this preferred embodiment of the invention, each of the doors 88 as illustrated in FIG. 4 includes a pair of circumferentially spaced hinge joints, or simply hinges, 106 which pivotally connect the upstream end 96 of the door 88 to the frame 56. Each hinge 106 includes an elongate support 108 extending from the frame 56 which includes an aperture 110 at a distal end thereof. A complementary pair of apertures 112 are disposed in a respective pair of the ribs 94 which sandwich the support 108, and a hinge rod, or bolt, 114 is suitably positioned through the apertures 110 and 112 for allowing the doors 88 to pivot relative to the frame 56. A conventional bushing (not shown) may be provided between the rod 114 and the apertures 110 and 112 for reducing friction therebetween.

In the preferred embodiment as illustrated in FIGS. 3 and 4, the hinge rod 114 of one of the hinges 106 is fixedly connected to the support 108 and has length sufficient for supporting a plurality of conventional coils 116 of the torsional spring 102 disposed coaxially therewith. For example, at least four coils 116 may be used. The spring 102 further includes a fixed end 118 at one side of the coils 116 which is fixedly connected to the hinge rod 114, which is fixedly conventionally connected to the support 108. The spring 102 includes an elongate, arcuate, concave free end 120 on the opposite side of the coils 116.

In an alternate embodiment (not shown), the spring fixed end 118 may also be elongate and extend from the hinge rod 114 to rest on an adjustable support, such as a threaded bolt, secured to the frame 56 or the support 108, for example. In this embodiment, the hinge rod 114 may be free to rotate relative to the support 108, if desired, with the spring coils 116 still being free to rotate about the hinge rod 114. By adjusting the length of the threaded bolt, the fixed end 118 resting thereon may be caused to move for either tightening or loosening the coil springs 116 relative to the free end 120 for adjusting the initial value of a closing force $F_c$ exerted by the spring free end 120 on the door 88. This feature then allows for individual adjustment of the initial closing force $F_c$ on each of the doors 88 to compensate for manufacturing tolerances which result in varying door weights and spring exertion forces, and to ensure unison of movement of all the doors 88. Of course, other arrangements for adjusting the initial spring closing force $F_c$ may be used.

Figure 6:
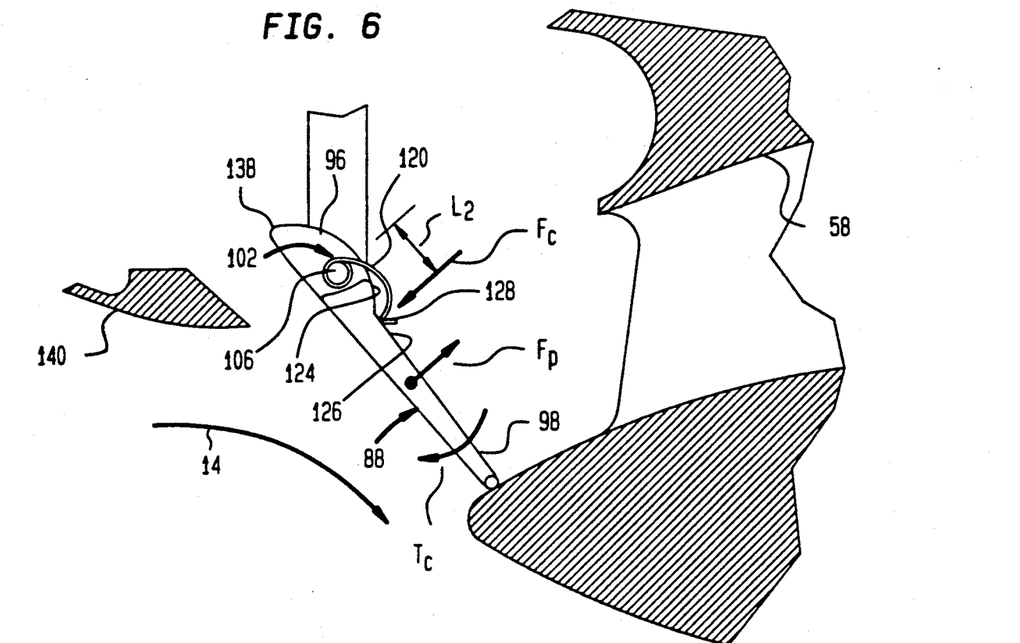
FIG. 6 is a schematic representation showing a sectional view of a bypass door in a closed position taken along line 6—6 in FIG. 4.

Referring now to FIGS. 2, 4 and 6, the positioning means 100 further includes a cam surface 122 on the door outer surface 92, which cam surface 122 includes a convex forward cam portion 124 disposed adjacent to the door upstream end 96 and a generally flat aft cam portion 126 extending from the forward cam portion 124 toward the door downstream end 98. The spring free end 120 includes an aft end 128 which contacts the aft cam portion 126 at least when the door 88 is in the closed position as illustrated in FIG. 6, for example. This provides the initial spring closing force, which is designated as a second value $F_2$ of the spring closing force $F_c$. The spring free end 120 also includes an intermediate portion 130 as illustrated more particularly in FIG. 7 which is disposed between the coils 116 and the spring aft end 128 which contacts the forward cam portion 124 at least when the door 88 is in the open position as illustrated in FIG. 7 for providing a first value $F_1$ of the closing force $F_c$.

Figure 7:
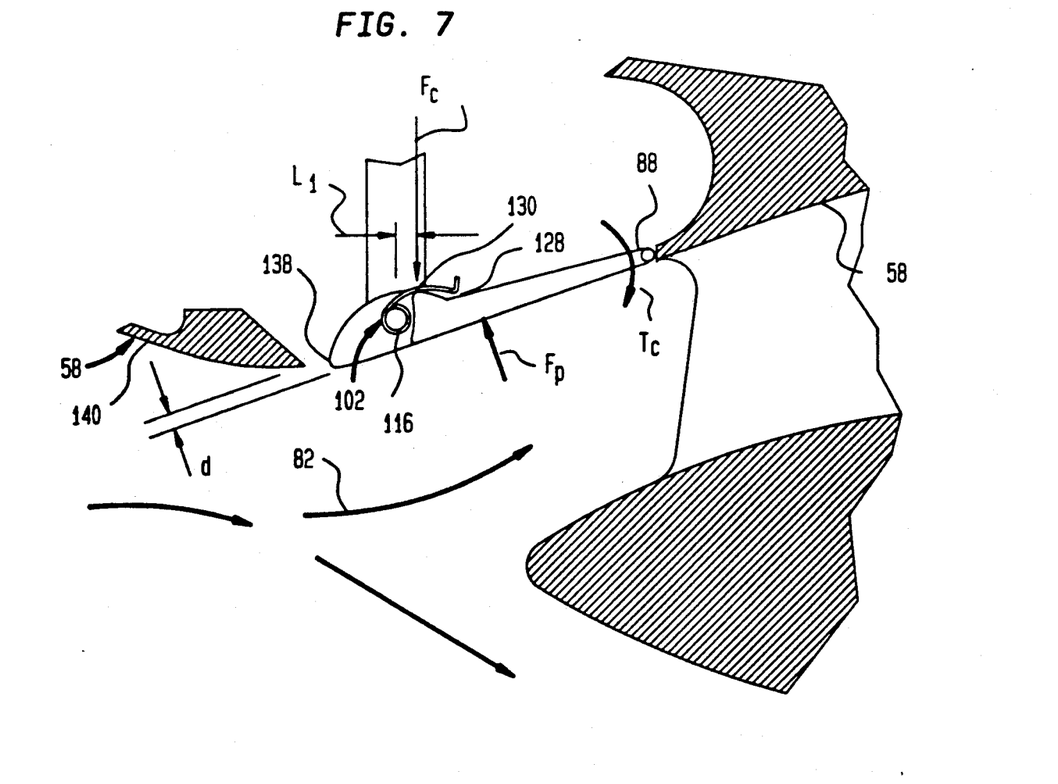
FIG. 7 is a schematic representation similar to the one illustrated in FIG. 6 showing one of the bypass doors in an open position.

Referring to FIGS. 5, 6 and 7, the convex spring free end 120, the forward cam portion 124 and the aft cam portion 126 are selected primarily so that the closing torque first value $T_1$ is less than the closing torque second value $T_2$ to ensure that the door 88 is fully open for providing substantially unobstructed flow into the second channel 72 upon a positive differential pressure $P_1-P_2$. Since the angular position $\theta$ of the torsional spring 102 continues to increase from the closed position to the open position as illustrated in FIG. 5, the closing force $F_c$ provided by the torsional spring conventionally increases. However, the positioning means 100 is effective for decreasing the closing torque $T_c$ by effective utilization of moment arms.

More specifically, as illustrated in FIG. 6, the closing force $F_c$ is applied to the door 88 over a moment arm $L_2$ measured from the hinge 106 to the spring aft end 128 which provides the closing torque $T_c$ equal to $F_2$ times $L_2$, having the particular value $F_2L_2$ for the closed position shown in FIG. 6. However, as the door 88 begins to open, the spring aft end 128 continues to contact the aft cam portion 126 for only a certain preselected range of rotation $\theta$, which may be zero if desired, with the closing force $F_c$ and closing torque $T_c$ increasing up to the point wherein the spring intermediate portion 130 contacts the forward cam portion 124 which occurs at an intermediate value $\theta_i$ between the closed and open positions of the doors 88. At this point, further opening of the door 88 causes the forward cam portion 124 to contact the spring intermediate portion 130 thusly lifting the spring aft end 128 from the aft cam portion 126 as illustrated for example in FIG. 7. The closing force $F_c$ acting on the door 88 now acts over a shorter length $L_1$ from the hinge 106 to the contact point at the spring intermediate portion 130. Although the restoring force, $F_c$, from the spring 102 may have increased as the door angle $\theta$ increased, the length $L_1$ is sufficiently less than the length $L_2$ for reducing the moment arm and the effective closing torque $T_c$ ($F_cL_1$) acting on the doors 88. For example, the closing torque first value $T_1$, which is represented by $F_1L_1$, is less than the closing torque second value $T_2$ of $F_2L_2$ since $L_1$ is preselectively smaller than $L_2$ to ensure that $T_1$ is less than $T_2$.

Accordingly, the closing torque $T_c$ acting on the doors 88 includes a first portion 132 as illustrated in FIG. 5 which increases until the forward cam portion 124 contacts the spring intermediate portion 130 at door angle $\theta_i$, and a second portion 134 wherein the closing torque $T_c$ decreases down to a minimum value of $T_1$ when the door 88 is fully open.

The spring 102 is sized and configured so that a positive differential pressure of $P_1-P_2$ across the door 88 in the second channel 72 is effective for opening the door 88 against the closing torque $T_c$, and a negative differential pressure of $P_1-P_2$ across the door 88 in the second channel 72 is effective for closing the door 88. In a preferred embodiment, the positive differential pressure is greater than about 0.5 psid (delta) to ensure that the door 88 opens relatively quickly upon application of a positive differential pressure $P_1-P_2$. It is to be noted that the differential pressure $P_1-P_2$ has a range of values during operation of the engine 10 and the positioning means 100 is effective for opening and closing the doors at about a single value of the differential pressure $P_1-P_2$ as the differential pressure increases and decreases, respectively, in the range for providing substantially instantaneous opening or closing of the doors 88. In other embodiments of the invention, the spring 102 could be sized so that the doors 88 open and close relatively slowly over a range of values of the differential pressure as desired.

As illustrated for example in FIGS. 3 and 4, each of the doors 88 includes at the downstream end 98 thereof, an elongate resilient seal 136 suitably secured to the downstream end 98, for example by attachment to a slot therein. The seal is effective for contacting the splitter 68 when the door 88 is placed in the closed position to ensure good sealing of the door 88 against the splitter 68. The seal 136 is also effective for providing damping of the door 88 due to a sudden closing contact with the splitter 68, or due to any vibration caused by impingement of the bypass airflow 82 against the doors 88. In the preferred embodiment the seal is made of an elastomer composition (such as commercially available RTV 106) that may be reinforced with woven cloth (such as fiberglass).

As illustrated in FIGS. 2, 3 and 7, the door downstream end 98 is substantially coextensive with the outer casing 58 when the door is in the open position for providing a substantially smooth flowpath transition at the door downstream end 98 and the outer casing 58 which defines a portion of the second channel 72. Since a reduction in the closing torque $T_c$ is obtained from the present invention, when the doors 88 are positioned to the open position from the closed position, the likelihood of the door 88 not fully opening is reduced, and in some embodiments eliminated.

As illustrated in FIGS. 6 and 7, the door 88 includes a leading edge 138 and the hinge 106 is preferably spaced downstream from the leading edge 138 so that the upstream end 96 forward of the hinge 106 serves as a counterweight to offset gravitational forces acting on the downstream end 98 for reducing the torque required for opening the door 88, in particular, for the top door 88 shown in FIG. 7. And, for the bottom doors 88, the counterweight due to the offset upstream end 96 tends to assist in closing the doors 88, thereby reducing the amount of closing force $F_c$ required by the spring 102.

Furthermore, the outer casing 58 includes a flowpath inner surface 140 as illustrated in FIG. 7, and the leading edge 138 is spaced perpendicularly therefrom at a distance d when the door 88 is in the open position so that the bypass airflow 82 impinges against the leading edge 138 for providing an additional, or second opening force or torque acting on the door 88 to further ensure that the door 88 is fully open and does not obstruct flow. This second opening torque is a direct function of flow rate of the bypass airflow 82 and has a maximum value at maximum $P_1-P_2$ when it is desirable for the doors 88 to be fully open. And, decreases in value as the bypass airflow 88 decreases, which is also desirable for allowing the doors 88 to close. The amount of the forward step defined by the distance d is preferably small so as not to create unacceptable levels of drag over the upstream end 96 which would offset the advantages of obtaining a fully open door 88. At substantial bypass airflow flow rates, the doors 88 will assume a stable position, thus minimizing any tendency of the doors 88 to flutter.

Figure 8:
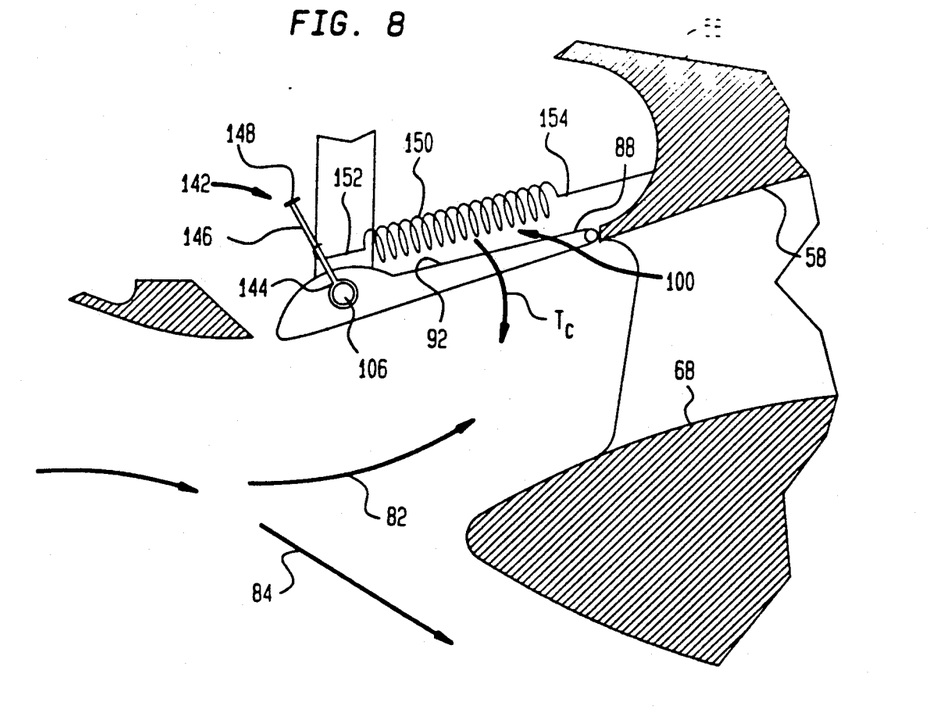
FIG. 8 is a schematic representation of another embodiment of the present invention including a bypass door joined to a linear spring effective for providing a closing torque.
Figure 9:
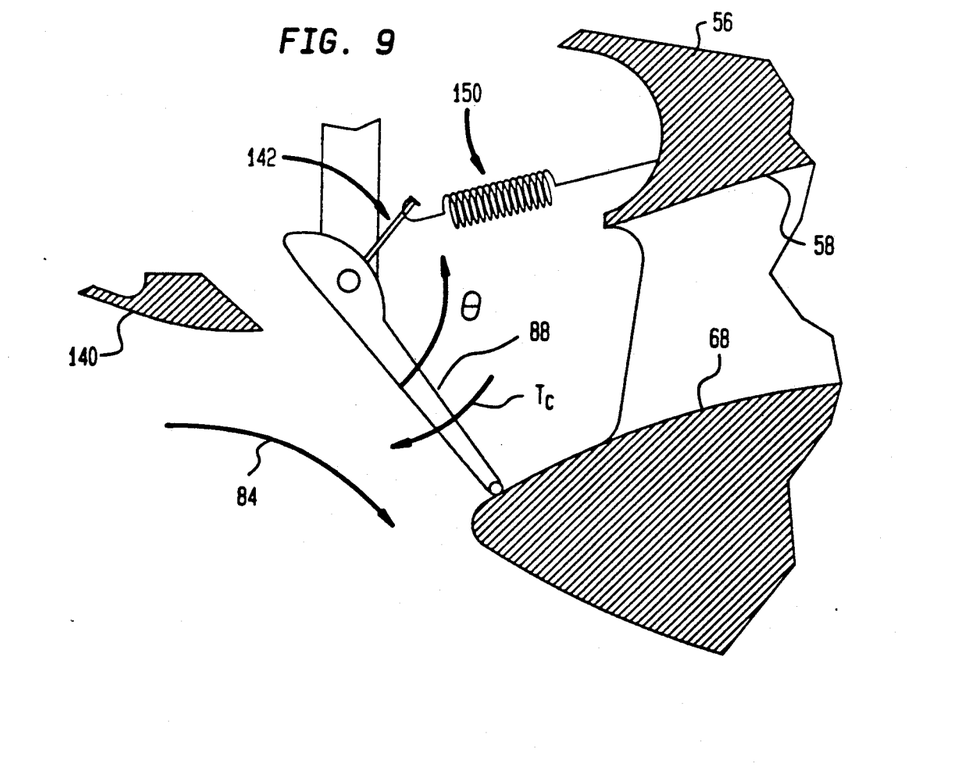
FIG. 9 is a schematic representation of the embodiment of the invention illustrated in FIG. 8 showing the bypass door in a closed position.
Figure 10:
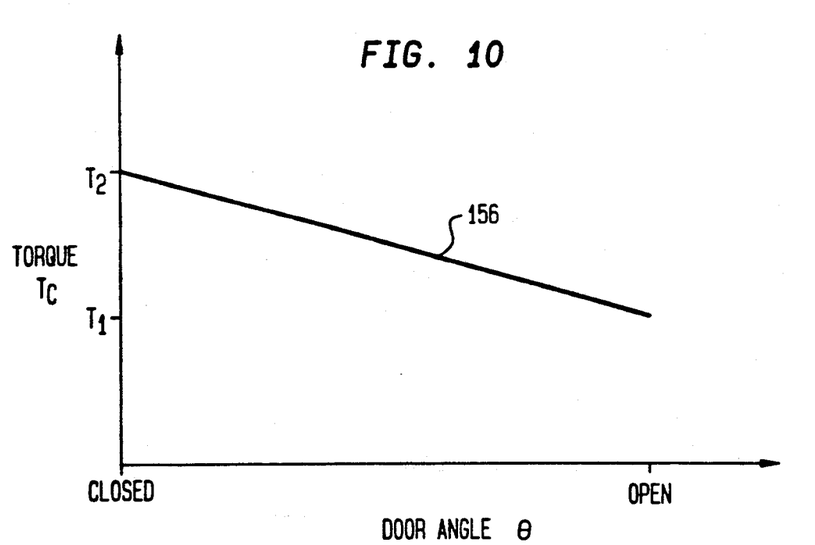
FIG. 10 is a graph plotting closing torque $T_c$ versus door angle $\theta$ associated with the embodiment of the invention illustrated in FIGS. 8 and 9.

Illustrated in FIGS. 8 and 9 is another embodiment of the present invention wherein the positioning means 100 includes a straight pin 142 disposed generally perpendicularly outwardly from the door outer surface 92. The pin 142 includes a first end 144 fixedly attached to the door at the hinge 106, an intermediate portion 146, and a second end 148 disposed oppositely to the first end 144. In this embodiment, the spring is in the form of a conventional linear spring 150 which has a first end 152 slideably attached to the pin intermediate portion 146, for example by a loop extending over the intermediate portion 146, and a second end 154 suitably joined to the frame 56. The pin 142 and the spring 150 are sized and configured so that the spring first end 152 is positionable along the pin intermediate portion 146 adjacent to the first end 144 when the door 88 is in the open position as illustrated in FIG. 8, and is positionable adjacent to the second end 148 when the door 88 is in the closed position as illustrated in FIG. 9. In this way, the closing torque introduced by the spring 150 on the door 88 decreases as the door position angle $\theta$ increases from the closed to the open position as illustrated in FIG. 10 which plots the closing torque $T_c$ represented by the straight, negatively sloped curve 156 versus the door angle $\theta$. The closing torque $T_c$ decreases generally linearly from $T_2$ to $T_1$ as the door is positioned from closed to open, respectively.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A bypass valve assembly for controlling fluid flow in a gas turbine engine comprising:
an annular frame including an outer casing, an inner casing spaced from said outer casing to define a channel for channeling fluid flow and said outer casing including an annular opening therein;
a plurality of circumferentially juxtaposed bypass valve doors disposed in said annular opening, each of said valve doors having an inner surface for facing said fluid flowable in said channel, an outer surface, a first end pivotally connected to said fame, and a second end, said doors being positionable in a first position generally parallel to said outer casing, and in a second position inclined relative to said outer casing, said fluid flow flowable against said door inner surface being effective for generating a fluid force on said door; and
means for automatically positioning said doors in first and second positions in response to differential pressure across said door, said positioning means providing a torque on said doors for moving said door from said first to said second positions and including torque adjustment means for reducing said torque for at least a portion of travel of said doors from said second to said first positions.

2. A bypass valve assembly according to claim 1 further comprising:
said annular frame inner casing being spaced from said outer casing to define a first channel foor channeling fluid flow, and a flow splitter disposed between said outer and inner casings to define a second channel and a third channel, spaced from said second channel by said splitter, said second and third channels being in flow communication with said first channel, and said outer casing annular opening facing said splitter;
said valve door inner surfaces being disposed for facing said fluid flowable in said second channel, said first end being an upstream end pivotally connected to said frame, and said second end being a downstream end, said first position being an open position allowing substantially unobstructed fluid flow from said first channel to said second channel, and said second position being a closed position substantially blocking fluid flow from said first channel to said second channel; and
said means for automatically positioning said doors in said first open, position and said second, closed position and said torque adjustment means providing a closing torque on said doors which decreases for at least a portion of travel of said doors from said closed to said open positions.

3. A bypass valve assembly according to claim 2 wherein said positioning means comprises a spring associated with each of said doors joining said door to said frame for providing said closing force on said door acting in a direction opposite to said opening force, said spring being positioned for providing a first value of said closing torque in said door open position at least large enough to close said door against the force of gravity acting on said door when said fluid opening force is zero, and a second value of said closing torque in said door closed position greater than said first value.

4. A bypass valve assembly according to claim 3 wherein said spring is sized and positioned so that a positive differential pressure across said door in said second channel is effective for opening said door, and a negative differential pressure across said door in said second channel is effective for closing said door.

5. A bypass valve assembly according to claim 4 wherein said positive differential pressure is greater than about 0.5 psid.

6. A bypass valve assembly according to claim 3 wherein said differential pressure has a range during operation of said gas turbine engine and said positioning means is effective for opening and closing said doors at about a single value of said differential pressure as said differential pressure increases and decreases, respectively, in said range.

7. A bypass valve assembly according to claim 3 wherein said spring comprises a torsional spring having a fixed end secured to said frame, a plurality of coils disposed at said door upstream end, and an elongate concave free end;
said torque adjustment means includes a cam surface on said door outer surface having a convex forward cam portion disposed adjacent to said door upstream end and a generally flat aft cam portion extending from said forward cam portion toward said door downstream end; and
said spring free end having an aft end contacting said aft cam portion at least when said door is in said closed position for providing said second value of said closing torque, and an intermediate portion disposed between said coils and said spring aft end contacting said forward cam portion at least when said door is in said open position for providing said first value of said closing torque.

8. A bypass valve assembly according to claim 7 wherein said spring aft end contacts said aft cam surface from said door closed position to an intermediate position of said door and said closing torque increases in value from said closed to said intermediate door positions, and said spring intermediate portion contacts said forward cam portion from said door intermediate position to said door open position and said closing torque decreases in value from said intermediate to said open door positions.

9. A bypass valve assembly according to claim 3 wherein said door downstream end includes an elongate resilient seal effective for contacting said splitter when said door is in said closed position for providing a seal therewith, and for providing vibration damping of said door.

10. A bypass valve assembly according to claim 3 wherein said door downstream end is substantially co-extensive with said outer casing when said door is in said open position for providing a substantially smooth flowpath transition at said door downstream end.

11. A bypass valve assembly according to claim 3 wherein said outer casing includes a flowpath inner surface and said door includes a leading edge spaced perpendicularly therefrom when said door is in said open position so that fluid flow impinges said leading edge for providing a second opening force acting on said door.

12. A bypass valve assembly according to claim 3 wherein said door includes a hinge pivotally connecting said upstream end to said frame, said hinge being disposed downstream from a leading edge of said door.

13. A bypass valve assembly according to claim 3 wherein said door includes a hinge pivotally connecting said upstream end to said frame, and wherein torque adjustment means further includes a pin disposed generally pperpendicularly outwardly from said door outer surface and having a first end fixedly attached to said door at said hinge, an intermediate portion, and a second end, and said spring is a linear spring having a first end slidably attached to said pin intermediate portion and a second end joined to said frame, said spring first end being positionable along said pin intermediate portion adjacent to said first end when said door is in said open position and positionable adjacent to said second end when said door is in said closed position.

14. A bypass valve assembly for controlling fluid flow in a gas turbine engine comprising:
an annular frame including an outer casing, an inner casing spaced from said outer casing to define a channel for channeling fluid flow, said outer casing including an annular opening therein and further comprising said annular inner casing being spaced from said outer casing to define a first channel for channeling fluid flow, and a flow splitter disposed between said outer and inner casings to define a second channel and a third channel spaced from said second channel by said splitter, said second and third channels being in flow communication with said first channel, and said outer casing annular opening facing said splitter;
a plurality of circumferentially juxtaposed bypass valve doors disposed in said annular opening, each of said valve doors having an inner surface for facing said fluid flowable in said channel, an outer surface, a first end pivotally connected to said fame, and a second end, said doors being positionable in a first position generally parallel to said outer casing allowing substantially unobstructed fluid flow from said first channel to said second channel, and in a second position inclined relative to said outer casing, said second position being a closed position substantially blocking fluid flow from said first channel to said second channel, said fluid flow flowable against said door inner surface being effective for generating a fluid force on said door;
means for automatically positioning said doors in first and second positions in response to differential pressure across said door, said positioning means providing a torque on said doors for moving said door from said first to said second positions, and said means for automatically positioning said doors in said first open, position and said second, closed position providing a closing torque on said doors which decreases for at least a portion of travel of said doors from said closed to said open positions;
said positioning means comprises a spring associated with each of said doors joining said door to said frame for providing said closing force on said door acting in a direction opposite to said opening force, said spring being positioned for providing a first value of said closing torque in said door open position at least large enough to close said door against the force of gravity acting on said door when said fluid opening force is zero, and a second value of said closing torque in said door closed position greater than said first value wherein said spring comprises a torsional spring having a fixed end secured to said frame, a plurality of coils disposed at said door upstream end, and an elongate concave free end; said positioning means further includes a cam surface on said door outer surface having a convex forward cam portion disposed adjacent to said door upstream end, a genenrally flat aft cam portion extending from said forward cam portion toward said door downstream end, said spring free end having an aft end contacting said aft cam portion at least when said door is in said closed position for providing said second value of said closing torque, and an intermediate portion disposed between said coils and said spring aft end contacting said forward cam portion at least when said door is in said open position for providing said first value of said closing torque whereby said torque decreases for at least a portion of travel of said doors from said second to said first positions.

15. A bypass valve assembly according to claim 14 wherein said spring aft end contacts said aft cam surface from said door closed position to an intermediate position of said door and said closing torque increases in value from said closed to said intermediate door positions, and said spring intermediate portion contacts said forward cam portion from said door intermediate position to said door open position and said closing torque decreases in value from said intermediate to said open door positions.

16. A bypass valve assembly according to claim 14 wherein said door downstream end includes an elongate resilient seal effective for contacting said splitter when said door is in said closed position for providing a seal therewith, and for providing vibration damping of said door.

17. A bypass valve assembly according to claim 14 wherein said door downstream end is substantially co-extensive with said outer casing when said door is in said open position for providing a substantially smooth flowpath transition at said door downstream end.

18. A bypass valve assembly according to claim 14 wherein said outer casing includes a flowpath inner surface and said door includes a leading edge spaced perpendicularly therefrom when said door is in said open position so that fluid flow impinges said leading edge for providing a second opening force acting on said door.

19. A bypass valve assembly according to claim 14 wherein said door includes a hinge pivotally connecting said upstream end to said frame, said hinge being disposed downstream from a leading edge of said door.

20. A bypass valve assembly according to claim 14 wherein said door includes a hinge pivotally connecting said upstream end to said frame, and wherein torque adjustment means further includes a pin disposed generally perpendicularly outwardly from said door outer surface and having a first end fixedly attached to said door at said hinge, an intermediate portion, and a second end, and said spring is a linear spring having a first end slideably attached to said pin intermediate portion and a second end joined to said frame, said spring first end being positionable along said pin intermediate portion adjacent to said first end when said door is in said open position and positionable adjacent to said second end when said door is in said closed position.

* * * * *